United States Patent
Staar

[15] 3,658,095
[45] Apr. 25, 1972

[54] FLUIDIC CONTROLLER FOR LIQUID COOLED GARMENT

[72] Inventor: James B. Staar, St. Paul, Minn.
[73] Assignee: The United States of America as represented by the Secretary of the Navy
[22] Filed: Jan. 21, 1971
[21] Appl. No.: 108,498

[52] U.S. Cl. ............................................. 137/81.5, 236/12
[51] Int. Cl. ......................... F15c 1/14, F15c 1/16, F15c 1/20
[58] Field of Search .................................. 137/81.5; 236/12

[56] References Cited

UNITED STATES PATENTS

| | | | |
|---|---|---|---|
| 3,091,393 | 5/1963 | Sparrow | 137/81.5 X |
| 3,383,038 | 4/1968 | Boothe | 137/81.5 X |
| 3,478,960 | 11/1969 | Taylor | 137/81.5 X |
| 3,481,352 | 12/1969 | Starr | 137/81.5 |
| 3,515,002 | 6/1970 | Palmer | 137/81.5 X |
| 3,515,158 | 6/1970 | Utz | 137/81.5 |
| 3,521,655 | 7/1970 | Glaze | 137/81.5 |

Primary Examiner—William R. Cline
Attorney—R. S. Sciascia, H. H. Losche and Paul S. Collignon

[57] ABSTRACT

A fluidic control system for regulating the temperature of fluid for cooling a garment having a fluid signal amplifier, a vortex value and an impact modulator. Cold fluid is throttled by the vortex valve and the output from the vortex valve is passed to one input port of the impact modulator. Warm water is fed to a second input port of the impact modulator and the stream of cold fluid impacts with the stream of warm fluid and the resulting mixture flows from the output port of the impact modulator to tubing in the garment.

3 Claims, 1 Drawing Figure

PATENTED APR 25 1972　　3,658,095
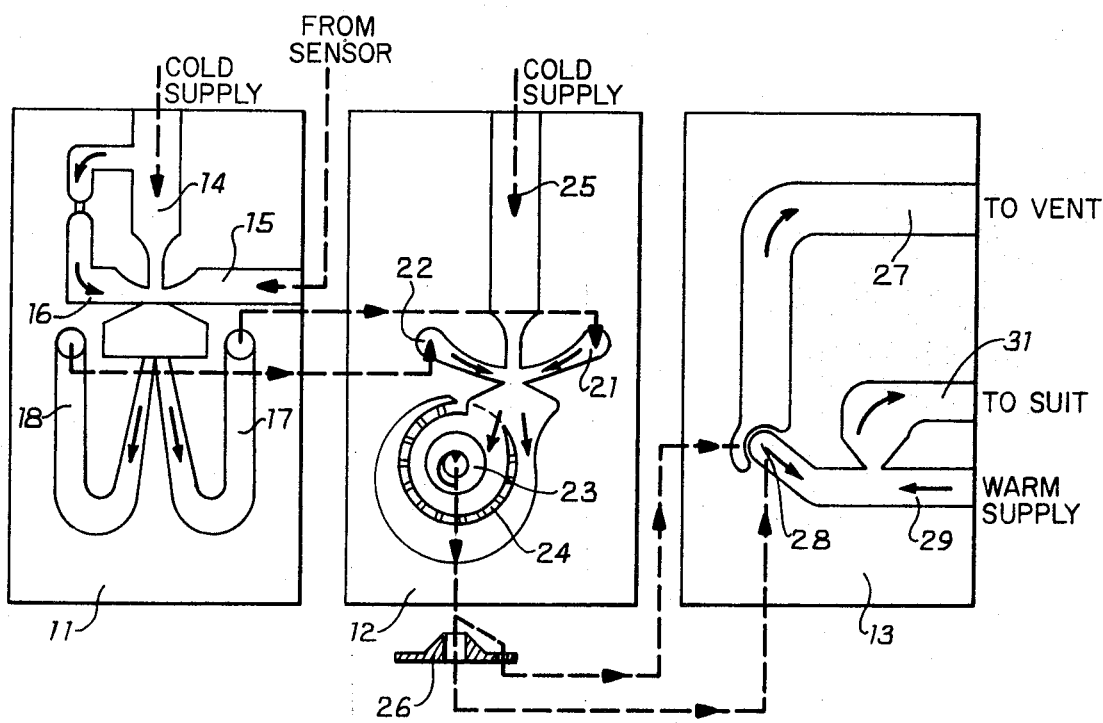
INVENTOR.
JAMES B. STARR
BY H. H. Loscke
Paul S. Collignon
ATTORNEYS

FLUIDIC CONTROLLER FOR LIQUID COOLED GARMENT

CROSS-REFERENCES TO RELATED APPLICATIONS

Patent application of James B. Starr entitled, "Temperature Sensor For Space Suit," Ser. No. 96,874, filed Dec. 10, 1970.

Patent application of James B. Starr entitled, "Temperature Control System for Space Suit," Ser. No. 92,469, filed Nov. 24, 1970.

BACKGROUND OF THE INVENTION

The present invention relates to a controller for a liquid cooled garment and more particularly to fluidic elements for providing throttling and mixing of liquids. Throttling is accomplished by a differential vortex valve and mixing is performed by an impact flow modulator.

The use of fluidic elements in cooling and heating systems is well-known in the art. For example, in U. S. Pat. No. 3,442,278, which issued May 6, 1969, to Rudolph Petersen there is shown a fluidic device for switching the flow of a fluid to one or the other of two different paths depending upon the temperature of the fluid. Also in U. S. Pat. No. 3,091,393, which issued May 28, 1963, to Hubert T. Sparrow, there is shown a hot water supply system that utilizes a fluid amplifier at a hot water tank.

SUMMARY OF THE INVENTION

The present invention relates to a fluidic controller for a liquid cooled garment and includes a signal amplifier, a differential vortex valve and an impact flow modulator. The signal amplifier is provided for magnification of a fluidic signal generated by a skin-temperature sensor, and the outputs of the signal amplifier are provided as inputs to a vortex valve. The vortex valve is provided for throttling of a cold supply of fluid. A conical flow diverter is provided to channel the output of the vortex valve to a vent and an impact modulator. Mixing of warm and cold fluid streams occurs at the impact flow modulator. Warm fluid is supplied at constant pressure to one inlet of the modulator, and cold fluid is supplied at varying pressures to the other inlet. An increase in cold fluid pressure increases the ratio of cold fluid to warm fluid flowing out of the modulator and, likewise, a decrease in cold fluid pressure decreases the ratio. The required variations in cold fluid pressure are produced by changing the flow resistance of the differential vortex valve.

BRIEF DESCRIPTION OF THE DRAWING

The FIGURE is a schematic representation of a preferred embodiment of the present invention showing a signal amplifier, a vortex valve and an impact modulator.

DESCRIPTION OF THE PREFERRED EMBODIMENT

Referring now to the drawing, there is shown a control system having a signal amplifier 11, a vortex valve 12 and an impact modulator 13. Signal amplifier 11 has an inlet 14 for receiving a supply of cold fluid and control ports 15 and 16 are provided for selectively switching the cold fluid to outlets 17 and 18. Control port 15 is connected to a supply of fluid which is controlled by a temperature sensor of the kind described in the above-identified patent application.

Vortex valve 12 is provided with control ports 21 and 22, and outlet 17 of amplifier 11 is connected with control port 21 and outlet 18 is connected with control port 22. Vortex valve 12 is provided with a vortex chamber 23 having a radial flow distribution manifold 24 around its circumference. A supply of cold fluid entering inlet 25 is selectively switched by control ports 21 and 22. Vortical flow of the cold fluid flowing directly into the vortex chamber 23 results in a high flow impedance condition and radial flow of the cold fluid through vortex chamber 23 from the distribution manifold 24 results in a low flow impedance condition. By way of example, vortex valve 12 might be of the type described in U. S. Pat. No. 3,481,352, entitled, "Fluid Apparatus," which issued Dec. 2, 1969, to James B. Starr.

A conical flow diverter 26 is provided to divide vortex valve exit and vent flow. A vent passage 27 is provided in impact modulator 13 and vent flow from vortex valve 12 enters passage 27 and then is returned to the cold supply of fluid. The vortex value flow is connected to a first inlet port 28 in impact modulator 13, and a second inlet port 29 is provided in impact modulator 13 for supplying a warm supply of fluid. The mixture of fluid from inlet ports 28 and 29 flows out of port 31 and is carried to the garment being cooled. In operation, the device of the present invention might be used in a system of the type described in the above-referenced application entitled, "Temperature Control System For Space Suit." A temperature sensor, of the type described in the above-referenced application entitled, "Temperature Sensor For Space Suit," is positioned adjacent the skin of a person wearing a garment and this temperature sensor regulates the flow of fluid into control port 15 of signal amplifier 11. Amplifier 11, in turn, regulates the output of vortex valve 12 which functions as a cold fluid throttle. Impact modulator 13 functions as a mixing valve where cold fluid from vortex valve 12 is mixed with a warm supply of fluid to provide fluid at a desired temperature which flows through tubing in a garment. Warm fluid is supplied to the second inlet port 29 of impact modulator 13 at constant pressure and cold fluid is supplied to inlet port 28 at varying pressures. An increase in cold fluid pressure increases the ratio of cold fluid to warm fluid flowing out of port 31 of modulator 13 and, likewise, a decrease in cold fluid pressure decreases the ratio.

In order to construct a small, compact controller, the fluidic elements 11, 12, and 13 can be assembled as a three layer device. The top layer can be the signal amplifier 11, the middle layer can be vortex valve 12 and the bottom layer can be the impact modulator 13.

I claim:

1. A fluid control system for regulating fluid in a garment comprising, fluid signal amplifier means having supply inlet means, control inlet means and first and second outlet means, a vortex valve having a vortex chamber, inlet means for receiving a supply of cold fluid into said vortex chamber, first and second control ports for controlling vortex action in said vortex chamber, and an outlet port for discharging cold fluid from said vortex chamber, said first and second outlet means of said signal amplifier means being connected, respectively, to said first and second control ports of said vortex valve, and an impact modulator having first and second inlet ports and an outlet port, said outlet port of said vortex valve being connected with said first input port of said impact modulator, and said second input port of said impact modulator being connected to a supply of warm fluid whereby cold fluid entering said first input port impacts with warm fluid entering said second input port and the resulting mixture flowing from said impact modulator outlet port is temperature regulated in accordance with the signal received at said control inlet means.

2. A fluid control system as set forth in claim 1 wherein said first and second inlet ports in said impact modulator are opposed one another.

3. A fluid control system as set forth in claim 1 wherein said signal amplifier means, said vortex valve and said impact modulator are mounted in contiguous layers.

* * * * *

PO-1050
(5/69)

UNITED STATES PATENT OFFICE
CERTIFICATE OF CORRECTION
UNDER RULE 322

Patent No. 3,658,095      Dated 25 April 1972

Inventor(s)    JAMES B. STARR

It is certified that error appears in the above-identified patent and that said Letters Patent are hereby corrected as shown below:

First page of Patent the inventor's name

JAMES B. STAAR should read

JAMES B. STARR   - Two Places

Signed and sealed this 10th day of October 1972.

(SEAL)
Attest:

EDWARD M.FLETCHER,JR.            ROBERT GOTTSCHALK
Attesting Officer                   Commissioner of Patents